(12) United States Patent
Hall et al.

(10) Patent No.: US 7,204,522 B2
(45) Date of Patent: Apr. 17, 2007

(54) DUCT DETECTOR HOUSING

(75) Inventors: David L. Hall, Lakeland, MI (US); James E. Ludwig, Waterford, MI (US)

(73) Assignee: Air Products and Controls, Inc., Pontiac, MI (US)

( * ) Notice: Subject to any disclaimer, the term of this patent is extended or adjusted under 35 U.S.C. 154(b) by 190 days.

(21) Appl. No.: 10/805,834

(22) Filed: Mar. 22, 2004

(65) Prior Publication Data

US 2004/0189003 A1  Sep. 30, 2004

Related U.S. Application Data

(60) Provisional application No. 60/457,436, filed on Mar. 25, 2003.

(51) Int. Cl.
*F16L 3/04* (2006.01)

(52) U.S. Cl. ............... 285/141.1; 285/154.1; 285/152.1; 285/401; 285/136.1

(58) Field of Classification Search ............ 285/93, 285/139.3, 141.1, 142.1, 143.1, 154.1, 149.1, 285/152.1, 401, 136.1
See application file for complete search history.

(56) References Cited

U.S. PATENT DOCUMENTS

| | | | | |
|---|---|---|---|---|
| 1,364,529 A | * | 1/1921 | Thomas, Jr. | 285/149.1 |
| 1,710,060 A | * | 4/1929 | Metcalf, Jr. | 285/149.1 |
| RE23,720 E | * | 10/1953 | Gillespie | 285/154.1 |
| 2,927,807 A | * | 3/1960 | Campbell | 285/154.1 |
| 3,379,459 A | * | 4/1968 | Smid | 285/149.1 |

* cited by examiner

*Primary Examiner*—David Bochna
(74) *Attorney, Agent, or Firm*—Gifford, Krass, Sprinkle, Anderson & Citkowski, P.C.

(57) ABSTRACT

A duct coupled air sampling detector housing includes a box to contain the detector. The box has a slotted sleeve adapted to receive tubular conduit having a protruding conduit tab. The conduit upon passing the protruding conduit tab through the sleeve slot is rotated such that the tab rests against a notch in the sleeve end that prevents the conduit from disengaging from the box. A conduit retainer overlies the inner end of the sleeve. A cover seals against the front face of the box to enclose the box volume containing the detector.

25 Claims, 2 Drawing Sheets

DUCT DETECTOR HOUSING

RELATED APPLICATION

This application claims priority of U.S. Provisional Patent Application Ser. No. 60/457,436 filed Mar. 25, 2003, which is incorporated herein by reference.

FIELD OF THE INVENTION

The present invention generally relates to covers, and in particular to a ductwork cover for rapid coupling to conduit.

BACKGROUND OF THE INVENTION

Air handling is a critical part of modern building infrastructure. In a variety of workplace settings, the properties of a gas traversing through an air handling system must be monitored. The gas stream passing through an air handling system is monitored for characteristics such as oxygen content, carbon monoxide content, particulate, and smoke. Unlike point detectors that are mounted to a ceiling or wall and passively sense gas convection currents reaching a single point detector, a ductwork detector is encased in a sealed housing in fluid communication with the flowing gas stream by way of a conduit inlet. The detector within the housing is in the active flow path of the gas handling system.

Compared to a single point detector, the installation, testing and servicing of a duct-coupled detector is considerable. Duct-mounted detectors are most often found elevated above ceiling space and have poor accessibility, with few surrounding structures capable of supporting the weight of a worker during installation. A conventional duct detector housing has a cylindrical sleeve through which conduit is pushed. In a conventional housing, after insertion into the sleeve, the conduit is retained in position by a flange that is screw mounted to the lip of the sleeve as shown in FIG. 1. The function of this design has been limited by the requirement that the retaining flange be repositioned or removed in order to afford a clear path for the insertion of conduit therethrough, repositioning for removal requiring use of a tool such as a screwdriver. The connection of an extended length of conduit tubing to a housing under such circumstances is problematic. Thus, there exists a need for a duct detector housing that couples to conduit without resort to tools or the removal of retainer components.

SUMMARY OF THE INVENTION

A duct detector housing includes a box able to receive a detector therein. The box has a sleeve traversing a side or rear face of the box. The sleeve has a bore designed to receive tubular conduit having a protruding tab on the lip of the conduit. The sleeve has an inner notch within the box and a slot extending to the outer end of the sleeve. The slot is adapted to pass the conduit tab therethrough. A conduit retainer overlies the inner end of the sleeve and prevents further conduit movement into the box. A cover seals against the front face of the box such that communication between the box interior and exterior is via the tubular conduit. A plurality of such slotted sleeves are built into the box to provide inlet and outlet conduits for gas that will be sampled by the detector contained within the housing. A sleeve is optionally integral to the box. The box is readily formed from an injectable thermoplastic or steel. In a preferred embodiment, the cover seating against the box face is transparent so as to afford visual inspection of the detector housed therein.

DETAILED DESCRIPTION OF THE INVENTION

The present invention has utility in the assembly of a duct containing gas handling system. An inventive housing has a sleeve with an interior slot along the length thereof. The sleeve is adapted to receive conduit therein. The conduit end engaging the sleeve has a tab extending from the conduit outer diameter and engaging the channel sleeve. Upon the tab passing through the channel, the conduit is rotated to and secured between a retainer and the interior face of the sleeve.

Figure 1:
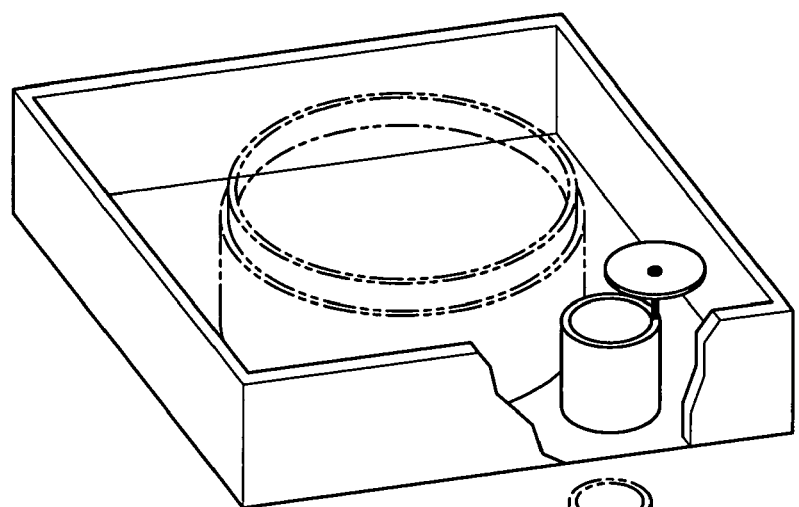
FIG. 1 is a perspective partial cutaway view of a prior art duct detector housing.
Figure 2:
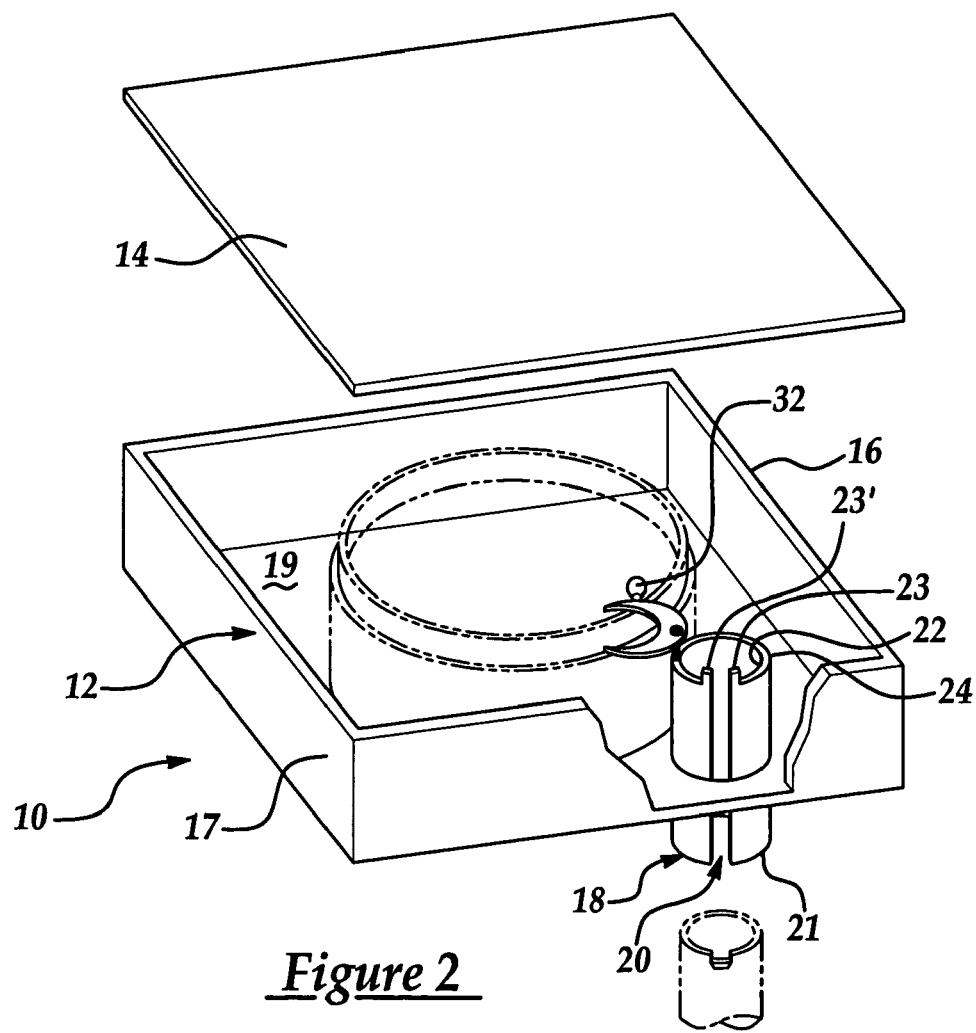
FIG. 2 is a partial cutaway view of an inventive duct detector housing.
Figure 3:
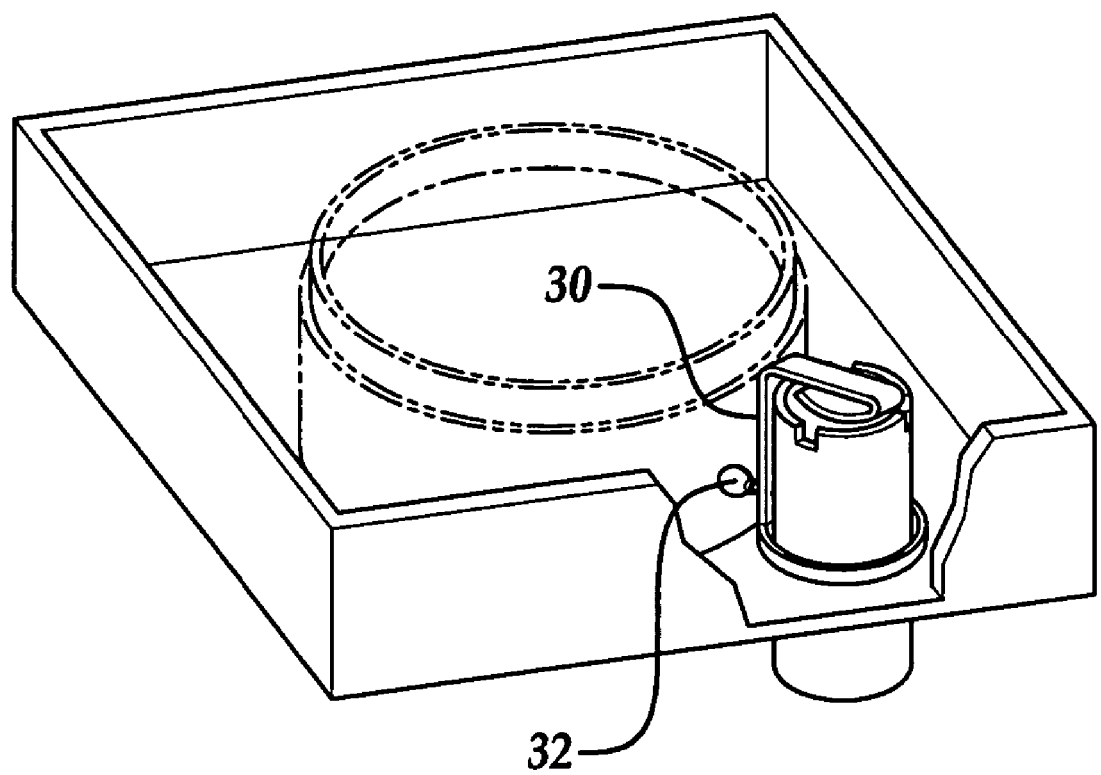
FIG. 3 is a partial cutaway view of an alternate embodiment of an inventive duct detector housing.

An inventive housing is shown generally at 10 in FIGS. 2 and 3 where like numbers denote like components therebetween. A volume for receiving a detector is defined by a housing box 12 and a housing cover 14. Preferably, a gasket 16 is provided at the interface between the box 12 and cover 14 in order to limit the confined gas pressure drop across the housing 10. A housing box according to the present invention is formed from a variety of materials conventional to the art illustratively including injectable thermoplastics such as polyalkylenes, chloride, polystyrene, and ABS; and steel. A cover of an inventive housing is preferably formed of a transparent material to afford visual inspection of the housing volume. It is appreciated that duct detectors are conventionally placed in fluid communication with a confined gas stream, these detectors sample for substances illustratively including smoke, carbon monoxide, oxygen, particle size, and specific allergens and microbes.

A housing box 12 has at least one conduit coupling sleeve 18. It is appreciated that two or more of such sleeves are in communication with an inventive housing to foster confined gas stream circulation. The sleeve 18 is optionally extending from a side 17 or rear face 19 of the housing box 12. The sleeve 18 has a slot 20 extending from the outer edge 21 to the inner end 22 of the sleeve 18. The slot 20 has a width able to accommodate a protruding tab extending from the end of tubular conduit. It is appreciated that the slot can be open as depicted in FIG. 2, or alternatively form an interior groove, as depicted in FIG. 3.

Preferably, the sleeve 18 is integral with the box 12. However, it is appreciated that a sleeve formed of the same or a disparate material relative to the box is readily secured to the box by way of an essentially gas-tight seal according to the present invention.

The inner end 22 has raised portions 23 and 23' on either side of the slot 20 forming a notch 24 about the circumference thereof. Preferably, raised portions 23 and 23' are spaced about the inner sleeve end so as to form additional notches 24', as shown in FIG. 3. A notch operative herein is appreciated to engage the conduit protruding tab and thereby mate the conduit to the housing 10. A retainer 25 (FIG. 2) or 30 (FIG. 3) is mounted within the box so as to overhang the inner sleeve end 22 at a distance spaced therefrom sufficient to allow the conduit protruding tab to rotate into the sleeve notch 24. As a result, the conduit is maintained in a relative position to the box 12 between the sleeve notch 24 and the retainer 25 or 30. It is appreciated that an inventive retainer is mounted either to the sleeve inner end or is anchored to a box inner surface. More preferably, an inventive retainer is movable to expose a clear conduit path to the sleeve from the interior of the box thereby affording the option of inserting conduit to an inventive ducted detector housing either from the outside end of the sleeve or through the interior end thereof. It is appreciated that the mode of repositioning an inventive retainer conduit can engage the sleeve and pass by the retainer is largely dependent on the nature of the retainer. For example, a circular washer 25 (FIG. 2) or spring clip 30 (FIG. 3) type retainer is repositioned to clear the space above the sleeve bore by rotation about the retainer mounting axis, whereas a tie-down type retainer having two opposing anchor points on either side of the sleeve bore (not shown) is repositioned by urging the retainer transverse relative to the anchor points or by simply disconnecting the retainer from one or both anchor points. Optionally, a thumb tab 32 is integrated into the retainer to facilitate repositioning thereof.

The preceding figures and description illustrate the general principles of the present invention, and some specific embodiments thereof. These are not intended to be a limitation upon the practice of the present invention since numerous modifications and variations will be readily apparent to one skilled in the art upon consideration of the drawings and description. The following claims, including all equivalents thereof, are intended to define the scope of the invention.

The invention claimed is:

1. A duct detector housing comprising:
    a box having a front face, a side and a rear face adapted to receive a detector therein, said box having a first sleeve, the first sleeve having a bore adapted to receive a tubular conduit having a protruding conduit tab, said first sleeve having an inner notched first end and an outer second end and a slot extending continuously between the first and second ends and adapted to pass the conduit tab therethrough, said notched first end having at least one notch with a depth running parallel to the axial length of said sleeve;
    a conduit retainer overlying a portion of the first end of said first sleeve; and
    a cover sealing against the front face of said box.

2. The housing of claim 1 wherein said first sleeve extends from the side of said box.

3. The housing of claim 1 wherein said first sleeve portion extends from the rear face of said box.

4. The housing of claim 1 further comprising a second sleeve and a second conduit retainer positioned to overlie said second sleeve.

5. The housing of claim 1 wherein said first sleeve is integral to said box.

6. The housing of claim 1 wherein the slot in said first sleeve is an interior groove.

7. The housing of claim 1 wherein the first notched end of said first sleeve has a notch of a depth capable of receiving the protruding tab of said conduit.

8. The housing of claim 7 further comprising a plurality of spaced notches.

9. The housing of claim 1 wherein said conduit retainer is a spring to urge said conduit into contact with the first end of said first sleeve.

10. The housing of claim 1 wherein said conduit retainer is affixed to said first sleeve.

11. The housing of claim 10 wherein the conduit retainer is threadably affixed to said first sleeve.

12. The housing of claim 1 wherein said conduit retainer is repositionable beyond a space above the sleeve bore.

13. The housing of claim 12 wherein said conduit retainer further comprises a thumb tab.

14. The housing of claim 1 wherein said box is formed of an injectable thermoplastic.

15. The housing of claim 1 wherein said cover is transparent.

16. A duct detector housing comprising: a box having a front face, a side and a rear face adapted to receive a detector therein, said box having a plurality of slotted sleeves, each of said plurality of slotted sleeves having a bore adapted to receive a tubular conduit having a protruding conduit tab and at least one of said sleeves having an inner notched first end and a second outer end and a slot extending continuously between the first and second ends and adapted to pass the conduit tab therethough, said notched first end having at least one notch with a depth running parallel to the axial length of said sleeve;
    a conduit retainer overlying each of said plurality of slotted sleeves; and
    a cover sealing against the front face of the box.

17. The housing of claim 16 wherein said plurality of sleeves are integral to said box.

18. The housing of claim 17 wherein said box is formed of an injectable thermoplastic.

19. The housing of claim 17 wherein said cover is transparent.

20. The housing of claim 16 wherein each of said plurality of sleeves has a notch capable of receiving the protruding tab of the tubular conduit.

21. The housing of claim 16 wherein said conduit retainer is a spring to urge said conduit into contact with the first end of said first sleeve.

22. The housing of claim 16 wherein said conduit retainer is affixed to said first sleeve.

23. The housing of claim 16 wherein the conduit retainer is threadably affixed to said first sleeve.

24. The housing of claim 16 wherein said conduit retainer is repositionable beyond a space above the sleeve bore.

25. The housing of claim 24 wherein said conduit retainer further comprises a thumb tab.

* * * * *